(12) United States Patent
Alderman

(10) Patent No.: US 10,041,623 B2
(45) Date of Patent: Aug. 7, 2018

(54) SYSTEMS, DEVICES, AND/OR METHODS FOR A VEHICLE UTILITY ATTACHMENT

(71) Applicant: Steven Craig Alderman, Meadows of Dan, VA (US)

(72) Inventor: Steven Craig Alderman, Meadows of Dan, VA (US)

(*) Notice: Subject to any disclaimer, the term of this patent is extended or adjusted under 35 U.S.C. 154(b) by 395 days.

(21) Appl. No.: 14/879,824

(22) Filed: Oct. 9, 2015

(65) Prior Publication Data

US 2017/0099944 A1  Apr. 13, 2017

(51) Int. Cl.
| F16M 11/26 | (2006.01) |
| F16M 13/02 | (2006.01) |
| E04H 15/08 | (2006.01) |

(52) U.S. Cl.
CPC ............ *F16M 11/26* (2013.01); *F16M 13/02* (2013.01); *A45B 2200/1063* (2013.01); *E04H 15/08* (2013.01)

(58) Field of Classification Search
CPC .............................. F16M 11/26; F16M 13/02
USPC ............... 297/217.1, 217.7; 296/64
See application file for complete search history.

(56) References Cited

U.S. PATENT DOCUMENTS

| 5,857,741 | A | 1/1999 | Anderson | |
| 5,938,092 | A * | 8/1999 | Johnson | B60R 9/06 296/26.08 |
| 6,082,269 | A | 7/2000 | Padberg | |
| D439,559 | S | 3/2001 | Caro | |
| D445,395 | S | 7/2001 | Okerlund et al. | |
| 6,314,891 | B1 | 11/2001 | Larson | |
| D468,681 | S | 1/2003 | Rath | |
| 6,808,231 | B1 * | 10/2004 | Hill | B60R 9/06 296/64 |
| 6,932,408 | B1 * | 8/2005 | Lyod, Jr. | B60N 2/005 296/63 |
| 6,935,064 | B1 | 8/2005 | Thompson | |
| 7,090,104 | B2 | 8/2006 | Dorety | |
| D593,760 | S | 6/2009 | Fidler | |
| 7,810,439 | B2 | 10/2010 | Bless | |
| D641,668 | S | 7/2011 | Exarhos | |
| 8,029,038 | B2 | 10/2011 | Woodhouse et al. | |
| 8,251,455 | B1 | 8/2012 | Midkiff et al. | |
| 8,291,832 | B2 | 10/2012 | Fisher | |
| 8,616,630 | B1 | 12/2013 | Midkiff et al. | |
| 2002/0008364 | A1 | 1/2002 | Kahlstorf | |
| 2003/0057244 | A1 | 3/2003 | Dorety | |
| 2004/0217573 | A1 | 11/2004 | Foster | |
| 2004/0251661 | A1 | 12/2004 | Davis | |
| 2005/0241546 | A1 | 11/2005 | Royse | |
| 2008/0006184 | A1 | 1/2008 | Simon | |
| 2008/0061097 | A1 | 3/2008 | Milender | |
| 2008/0231029 | A1 | 9/2008 | Hummel | |
| 2011/0225866 | A1 | 9/2011 | Pippen | |

(Continued)

*Primary Examiner* — Anthony D Barfield
(74) *Attorney, Agent, or Firm* — Dale Jensen, PLC; Dale Jensen

(57) ABSTRACT

Certain exemplary embodiments can provide a system comprising a hitch member. The hitch member is constructed to be releasably coupled to a towing hitch port of a vehicle. The system can comprise a cross-member. The cross-member can be operatively coupled to the hitch member. When uncoupled from the vehicle, the hitch member can be constructed to rotate around a longitudinal axis of the cross-member. The system can comprise a first adjustable leg and a second adjustable leg.

17 Claims, 10 Drawing Sheets

(56) References Cited

U.S. PATENT DOCUMENTS

2012/0266786 A1 10/2012 Wyman
2013/0154174 A1  6/2013 Welsh
2013/0257121 A1 10/2013 Otta

* cited by examiner

SYSTEMS, DEVICES, AND/OR METHODS FOR A VEHICLE UTILITY ATTACHMENT

BACKGROUND

People's lives revolve around their vehicles either for work or play. After being in hospitality industry for years and having a food trailer, the inventor noticed people tailgating. Working on the concept of tailgating led to improvements in seating and tables and their incorporation into a convenient package. This led to a tailgating work station and/or sporting system, with more uses disclosed and apparent to those skilled in the art.

SUMMARY

Certain exemplary embodiments provide a system, which can be mounted to a receiver hitch of a vehicle and used for occasions of work, sporting, and/or tailgating, etc. Certain exemplary embodiments provide a relatively stable platform, table space, and/or bench with a hitch member.

If more table space or seating is desired, certain exemplary systems offer options to custom build a system in accordance with desires of a user. By adding an extended frame, the user can add a work/bar top, multi-person seat, cooking grill support, canopy, umbrella, tent, flag pole, and/or one person seat seats, etc.

Certain exemplary embodiments are easy to assemble and disassemble folding into a substantially self-contained package with a carrying handle. Whether the user is working at a job and desires additional workspace, is in the wild and desires a place to sit and fish, or tailgating at sporting events; exemplary systems can be useful.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a system comprising a hitch member. The hitch member is constructed to be releasably coupled to a towing hitch port of a vehicle. The system can comprise a cross-member. The cross-member can be operatively coupled to the hitch member. When uncoupled from the vehicle, the hitch member can be constructed to rotate around a longitudinal axis of the cross-member. The system can comprise a first adjustable leg and a second adjustable leg.

Certain exemplary embodiments can provide a multi-use system constructed to couple to a receiver hitch, or use with a vehicle. Certain exemplary systems feature a hitch member that engages to a hitch on a vehicle. The hitch member is used for an array of components. The components comprise work, sporting, and tailgating options. Each component can be interchangeable such that components can be added or removed to adapt to the desires of a user. When not in use, certain exemplary systems can fold into a substantially self-contained package that can be easily carried and/or stored. Components can comprise tables, work tops, seats, canopies, tents, and/or umbrellas, etc.

Figure 1:
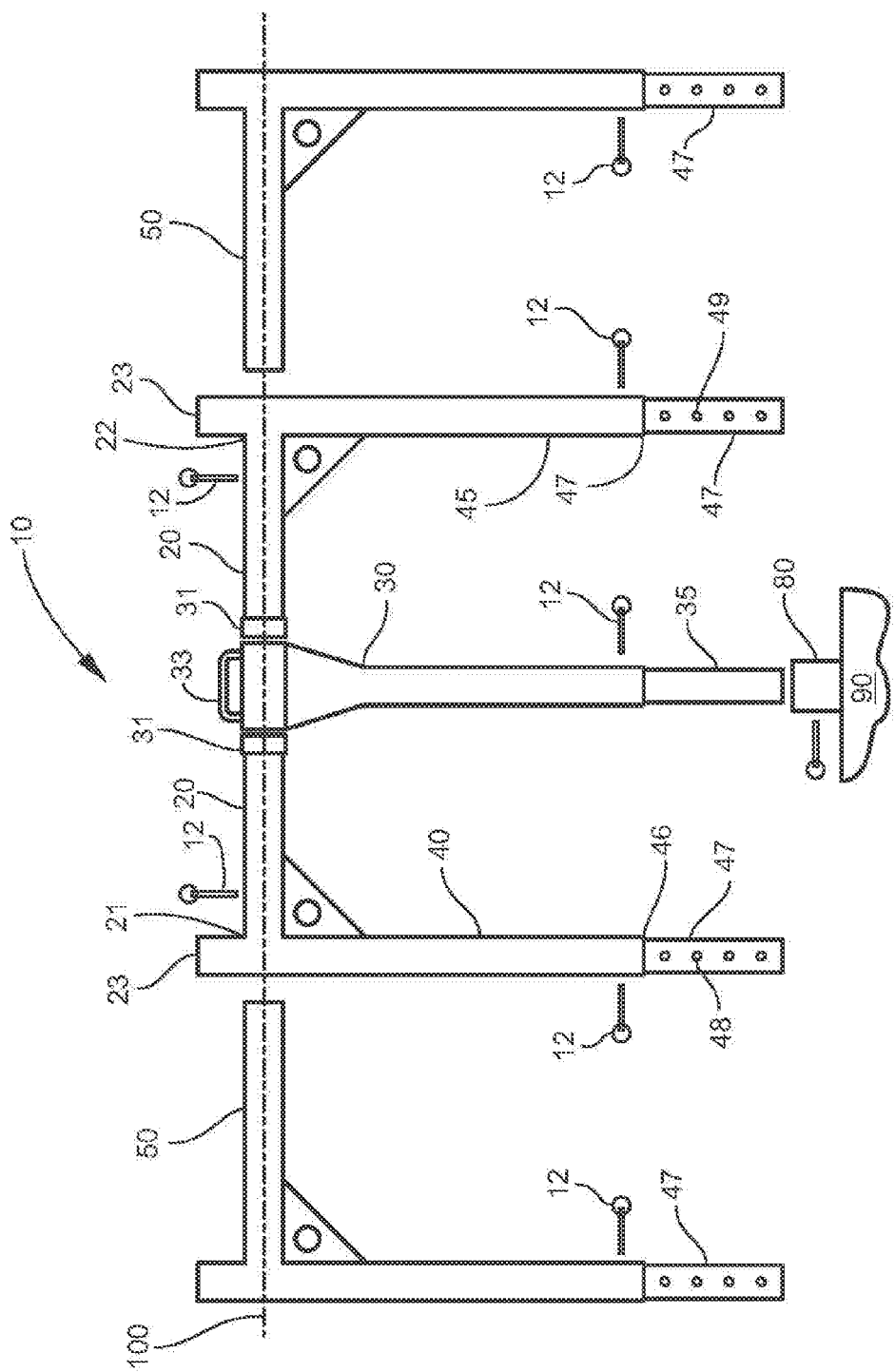
FIG. 1 is a plan view of an exemplary embodiment of a system.
Figure 2:
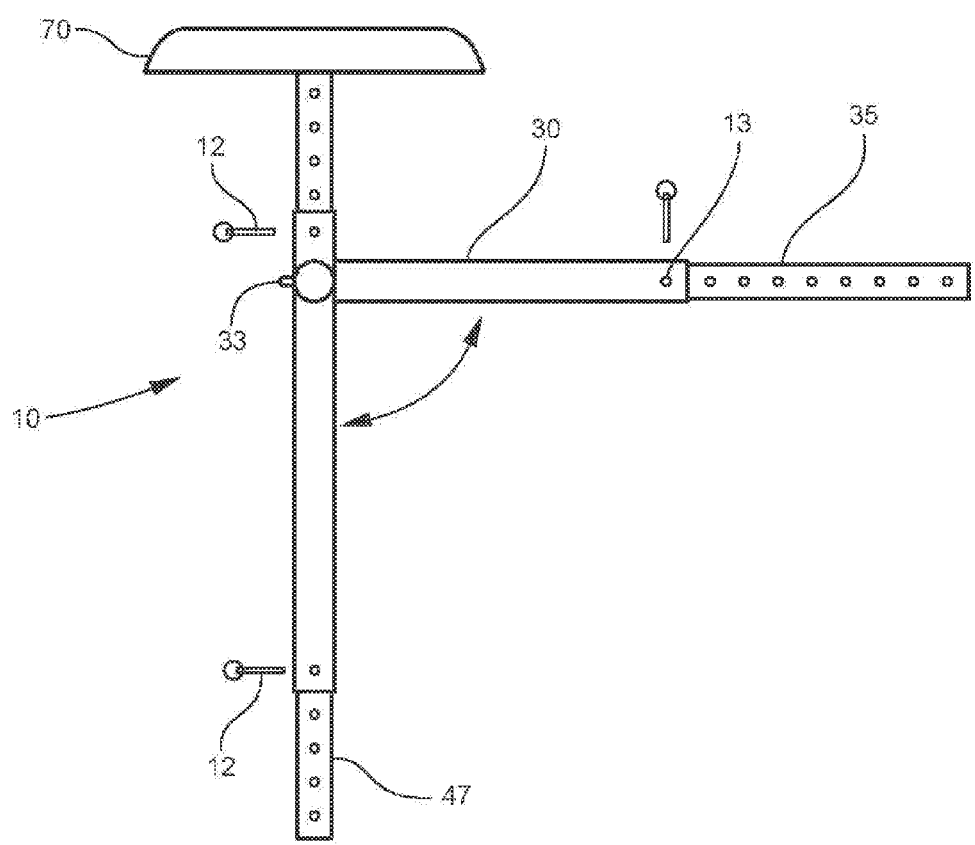
FIG. 2 is a side view of an exemplary embodiment of a portion of the system.
Figure 3:
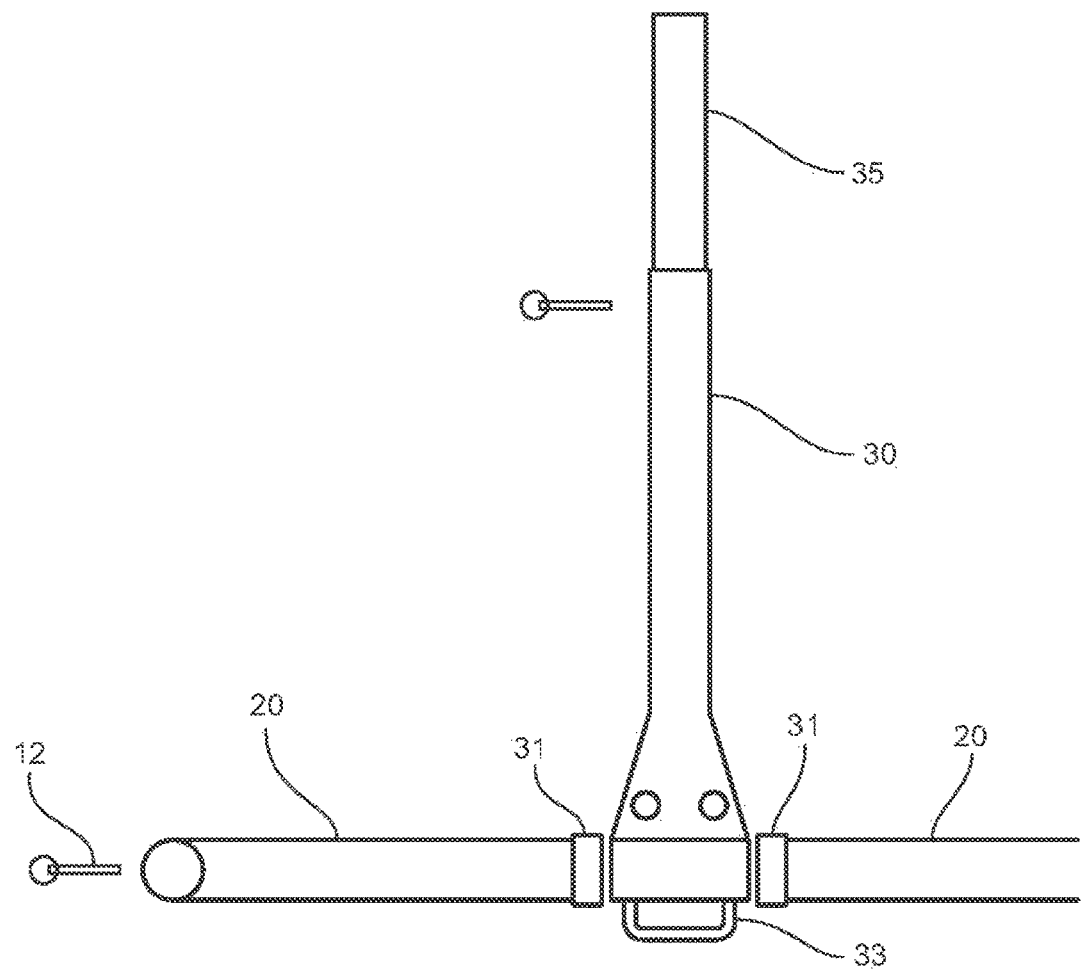
FIG. 3 is a top view of an exemplary embodiment of a portion of the system.
Figure 4:
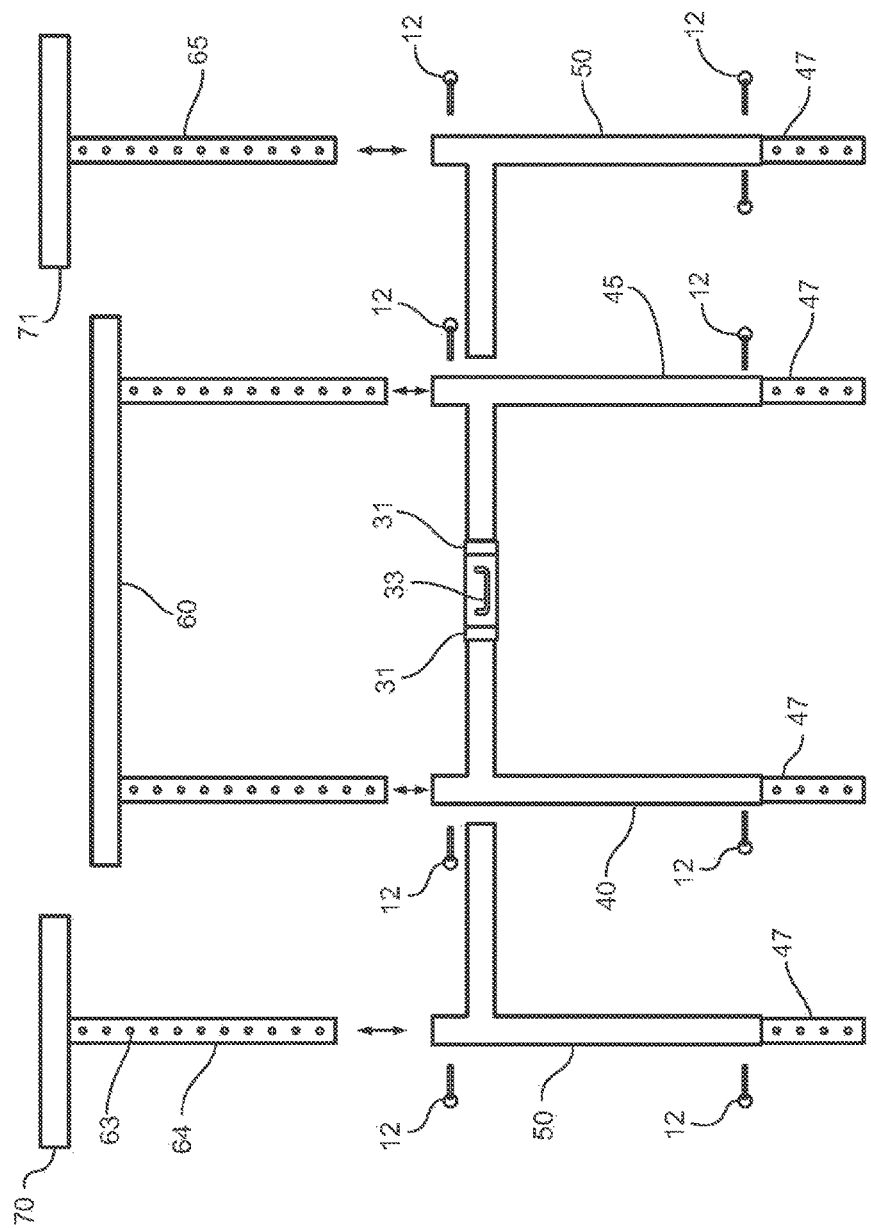
FIG. 4 is a plan view of an exemplary embodiment of a portion of the system.
Figure 5:
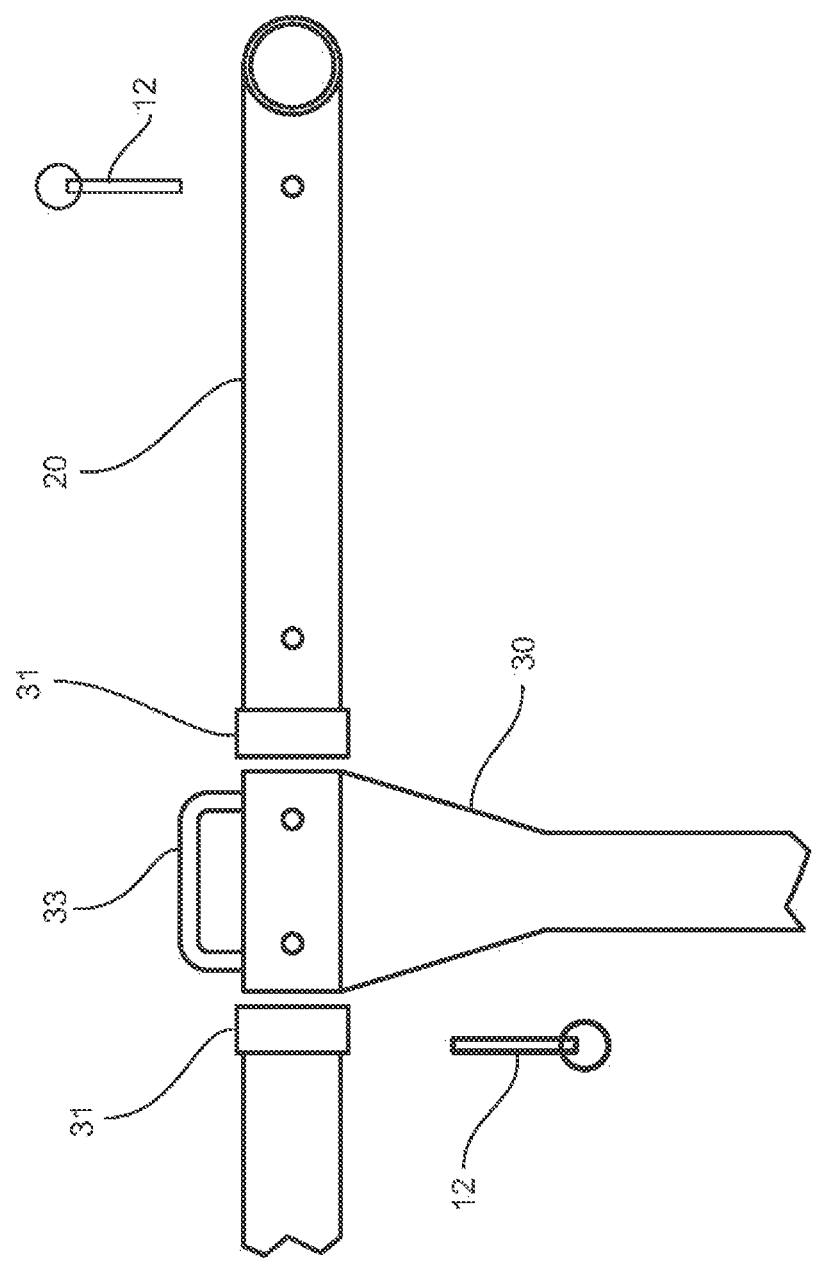
FIG. 5 is a plan view of an exemplary embodiment of a portion of the system.
Figure 6:
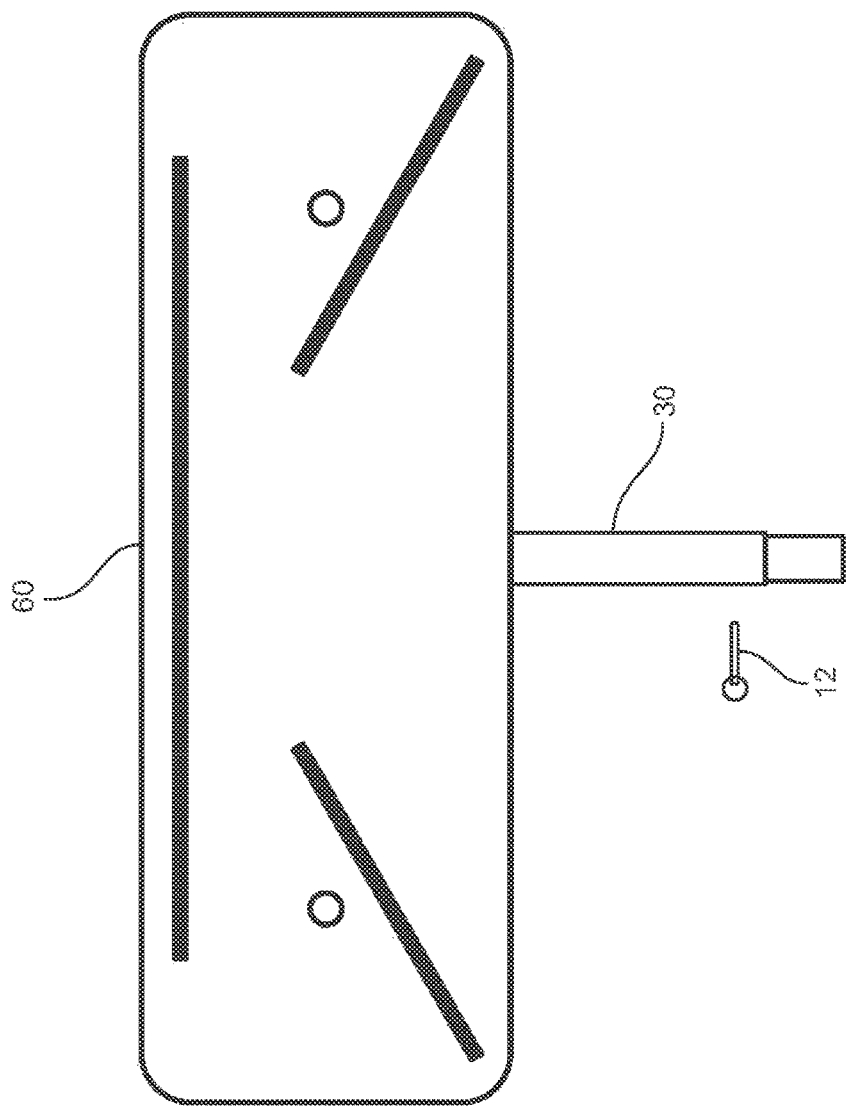
FIG. 6 is a plan view of an exemplary embodiment of a portion of the system.
Figure 7:
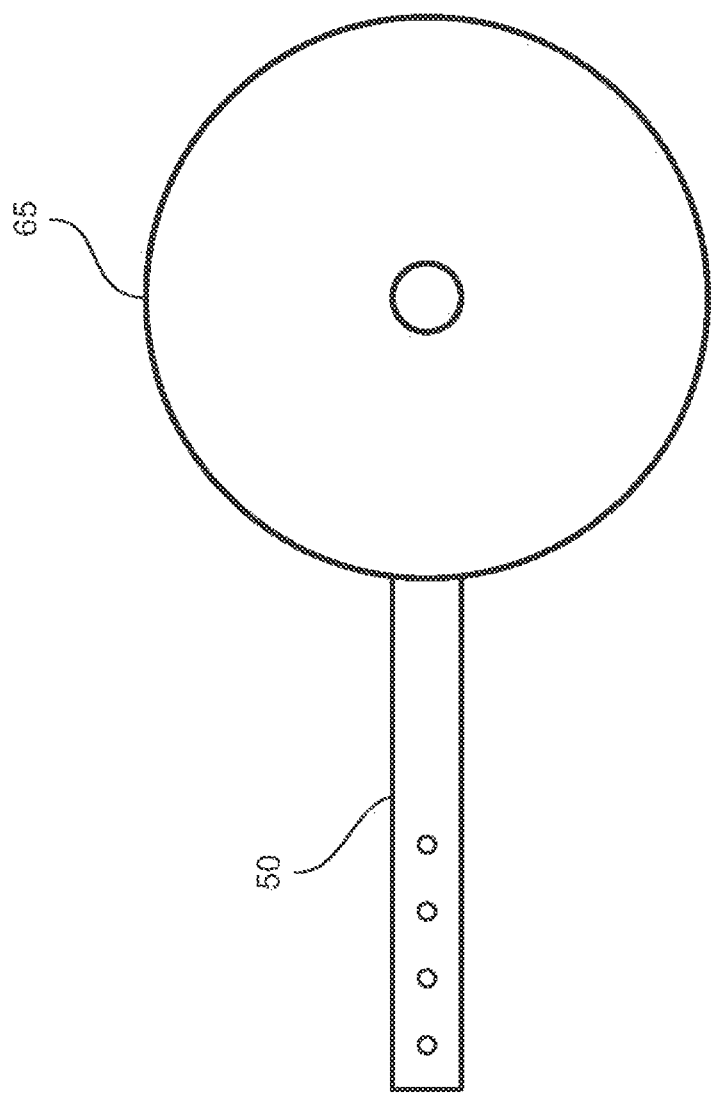
FIG. 7 is a top view of an exemplary embodiment of a portion of the system.
Figure 8:
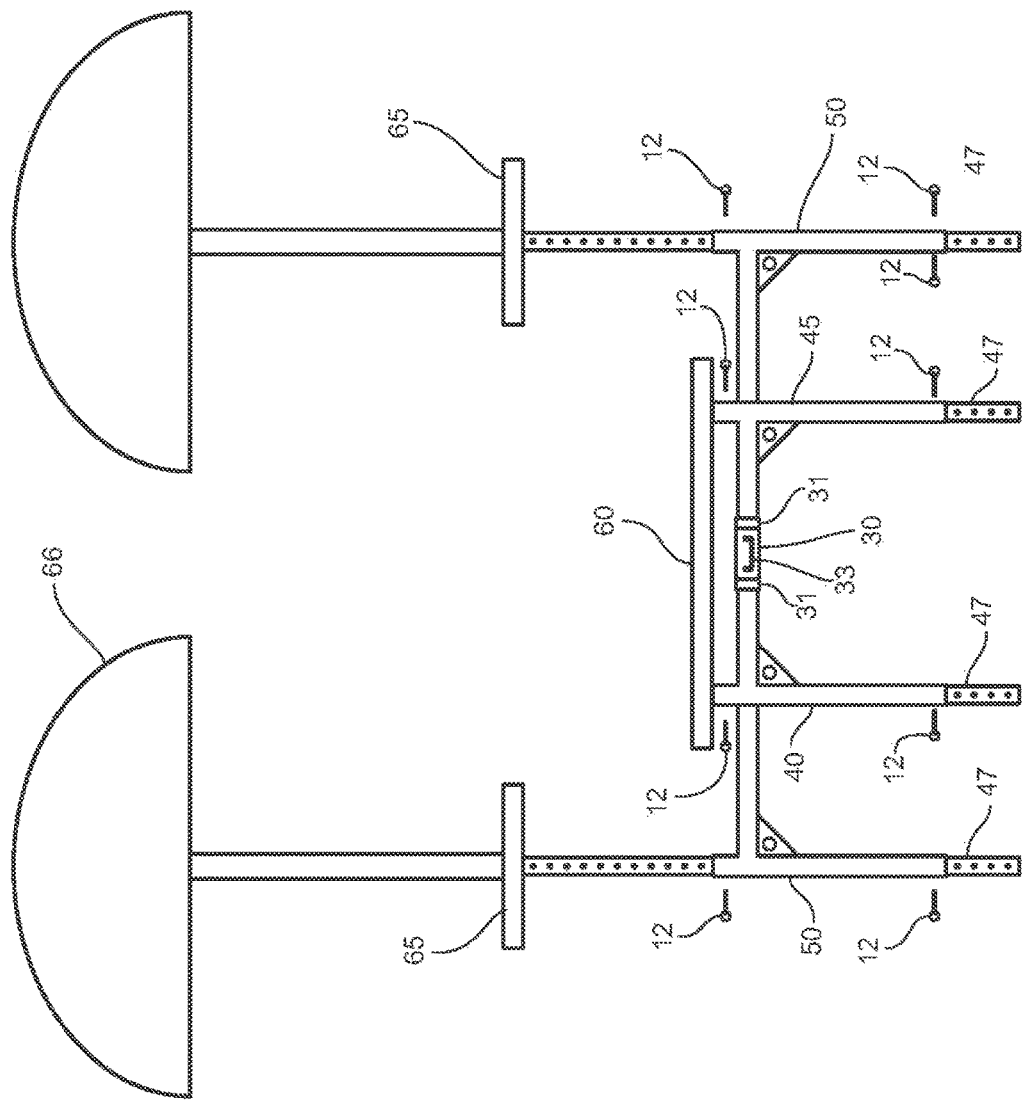
FIG. 8 is a side view of an exemplary embodiment of a portion of the system.
Figure 9:
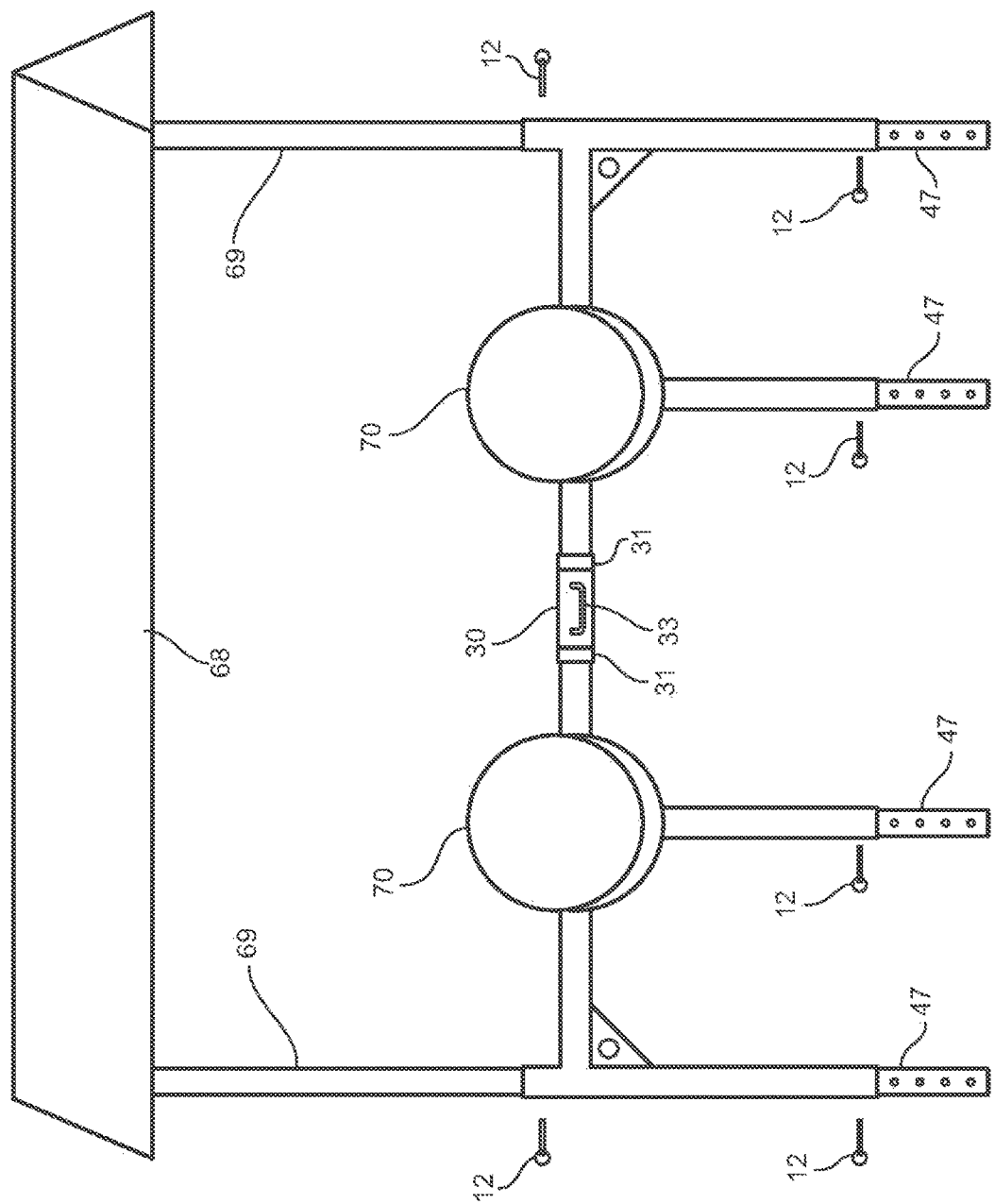
FIG. 9 is a side view of an exemplary embodiment of a portion of the system.

FIG. 1 is a plan view of an exemplary embodiment of a system. FIG. 2 is a side view of an exemplary embodiment of a portion of the system. FIG. 3 is a top view of an exemplary embodiment of a portion of the system. FIG. 4 is a plan view of an exemplary embodiment of a portion of the system. FIG. 5 is a plan view of an exemplary embodiment of a portion of the system. FIG. 6 is a plan view of an exemplary embodiment of a portion of the system. FIG. 7 is a top view of an exemplary embodiment of a portion of the system. FIG. 8 is a side view of an exemplary embodiment of a portion of the system. FIG. 9 is a side view of an exemplary embodiment of a portion of the system.

In certain exemplary embodiments, the system comprises a base unit 10 to which options attach; a cross-member 20, which can be a horizontal tube that intersects with two substantially vertical legs; a first adjustable leg 40; and a second adjustable leg 45. First adjustable leg 40 and second adjustable leg 45 are respectively coupled onto each of a first end 21 and a second end 22 of cross-member 20, which cross-member 20 defines mounting apertures 23, which can couple certain accessories to the system.

At bases 46 of first adjustable leg 40 and second adjustable leg 45, leg inserts 47 can be coupled to the system. Leg inserts 47 can be used to adjust a height to make exemplary systems usable for a variety of vehicle heights. Leg inserts 47 can be cross-drilled, as are first adjustable leg 40 and second adjustable leg 45. Pins 12 can be used to hold the system stable at different vehicle hitch heights via insertion in a selected set of apertures defined by leg inserts 47.

A hole in top of first adjustable leg 40 and second adjustable leg 45 of base unit 10 is the insert location for featured options: accessory 60, and one person seat 70. They are each cross-drilled for accepting pins 12 and thereby allowing height adjustments. Accessory 60 can be a work platform, sport top, tailgating platform, and/or a seat, etc. Another mounting location for additional options are extending apertures in outside of first adjustable leg 40 and second adjustable leg 45. The extending apertures can be in an insert location for featured options, which can be carried with base unit 10 when folded into a self-contained package when not in use.

In a center of cross-member 20 is a rotational center console 30, which can be held in place by two tube collars 31, left and right, attached to cross-member 20 at an outside of rotational center console 30 to rotate up to 360 degrees about a longitudinal axis 100 of cross-member 20, allowing base unit 10 to fold into a compact self-containing package.

On rotational center console 30 is a carrying handle 33. When folded into self-contained package, carrying handle 33 can be rotated to a top of the self-contained package; making the system relatively easy to carry and store.

From a second end of rotational center console 30, carrying handle 33 can be on and/or coupled to hitch member 35. This enables the rotational center console 30 to extend or retract into a hitch receiver for depth adjustments for different vehicles, or for using different options.

Base unit 10 can be practical, light weight, and stable and is relatively easy to carry and store; which can allow for a wide variety of options and configurations. Certain exemplary embodiments can be used with accessory 60, which can allow the user to custom build a unit; leaving a wide variety of possible configurations.

The accessory 60 can either be a work platform, sport table, and/or bench seat, etc.; which mounts into base unit 10. A tube can extend from a bottom of accessory 60 and can be inserted into a top of first adjustable leg 40 and second adjustable leg 45. Pins 12 can be used through cross-drilled apertures in each piece; allowing height adjustments. In a highest height adjustment, accessory 60 can be positioned at approximately a same height as an open tailgate of the vehicle; thus having more flat, solid work space. This can allow room for using tools, etc. Certain exemplary embodiments can utilize accessory 60 with extra space for use in the wild, cleaning guns, and/or cleaning game, etc. It can also be lowered in height to be used as accessory 60 at sports events, or a place to sit and fish.

Optional one person seat 70 can replace accessory 60 in the tops of first adjustable leg 40 and second adjustable leg 45 in base unit 10; or use with a work platform, sport top, and/or multi-person seat by adding an extending frame 50, which in certain exemplary embodiments can comprise a flag pole. Accessory 60 can be used as a sport table to on base unit 10, and use one person seat 70 in an extending frame 50. A user can couple accessory 60 as a seat on base unit 10 and/or one person seat 70 on an extending frame 50. Such embodiments can allow for more seating at tailgating events.

Certain exemplary embodiments can utilize extending frame 50, which can have characteristics like base unit 10; first adjustable leg 40 and second adjustable leg 45 can be added to base unit 10 into ends of cross-member 20. Extending frame 50 can have a substantially even height above ground via first adjustable leg 40 and second adjustable leg 45; and pins 12 can extend through cross-drilled hole in each piece. Extending frame 50 allows more options to be added.

Second adjustable platform support 65 can be a multi-use piece, which is mounted into the top of extending frame. Certain exemplary embodiments can be raised to a level of accessory 60 when in a work position. Such can be a handy, added, adjustable height work space for cutting long boards, pipe, etc. When using accessory 60 or optional one person seat 70, certain exemplary embodiments can be used as a bar top table constructed to expand a tailgating party outward; creating a larger area. In a center of second adjustable platform support 65 is a hole where more options can be mounted. Umbrellas 66, canopy 68, or flags are some of the options that can be used as options for use in an area of the second adjustable platform support 65 option.

Umbrella 66 can be used as a simple umbrella that mounts into either accessory 60 or second adjustable platform support 65 in the apertures located in the center of each piece. This allows certain exemplary systems to provide shade.

Canopy 68 can be used with accessory 60 or optional one person seat 70 by adding extending frame 50 to base unit 10, and inserting upright canopy pole 59 into a top of extending frame 50; via pins 12 through cross-drilled apertures in canopy pole 69 and extending frame 50; and then at the top of upright, the user can couple a top of canopy 68. Canopy 68 can comprise a top, which features a collapsible A-frame that folds into its own self-containing package. Canopy 68 can be used on a job, hunting/fishing, or tailgating at a game to provide shade.

Certain exemplary embodiments provide hitch member 35, which can be constructed to be releasably coupled to a towing hitch port 80 of a vehicle 90. Cross-member 20 can be operatively coupled to hitch member 35. When uncoupled from vehicle 90, hitch member 35 can be constructed to rotate around a longitudinal axis 100 of cross-member 20. First adjustable leg 40 can be operatively coupled to cross-member 20. First adjustable leg 40 can define a set of first leg adjustment apertures 48, which can be constructed to be engaged via a first adjustable leg pin to establish a height of a first end of cross-member 20 relative to a surface upon which vehicle 90 rests. Second adjustable leg 45 can define a set of second leg adjustment apertures 49, which can be constructed to be engaged via a second adjustable leg pin to establish a height of a first end of cross-member 20 relative to a surface upon which vehicle 90 rest. One or more of the referenced pins 12 can be spring pins comprised by one or more system components.

First adjustable platform support 64 can be operatively coupled directly or indirectly to cross-member 20. First adjustable platform support 64 can comprise a set of first platform adjustment apertures 63. A first adjustable platform pin can be constructed to engage with one of the set of first platform adjustment apertures to establish a height of first adjustable platform support 64 relative to the surface upon which vehicle 90 rests. Second adjustable platform support 65 can be operatively coupled directly or indirectly to cross-member 20. Second adjustable platform support 65 can comprising a set of second platform adjustment apertures 67. A second adjustable platform pin can be constructed to engage with one of the set of second platform adjustment apertures to establish a height of second adjustable platform support 65 relative to the surface upon which vehicle 90 rests.

Hitch member 35 can comprise carrying handle 33, which can be constructed to allow a human to lift the system when the system is not coupled to vehicle 90. Hitch member can be coupled to cross-member 20 via one or more collars 31. Hitch member 35 can have an adjustable length.

A first one person seat 70 can be constructed to be operatively coupled to first adjustable platform support 64. One person second seat 71 can be constructed to be operatively coupled to second adjustable platform support 65. Certain attachments can be operatively coupled to first adjustable platform support 64 and second adjustable platform support 65; such attachments can comprise:

accessory 60, which can be a multi-person seat or work platform;
second adjustable platform support 65, which can be a tailgating platform;
umbrella 66;
canopy 68, which can also be a tent; and/or
flag pole, which can be comprised by extending frame 50.

Figure 10:
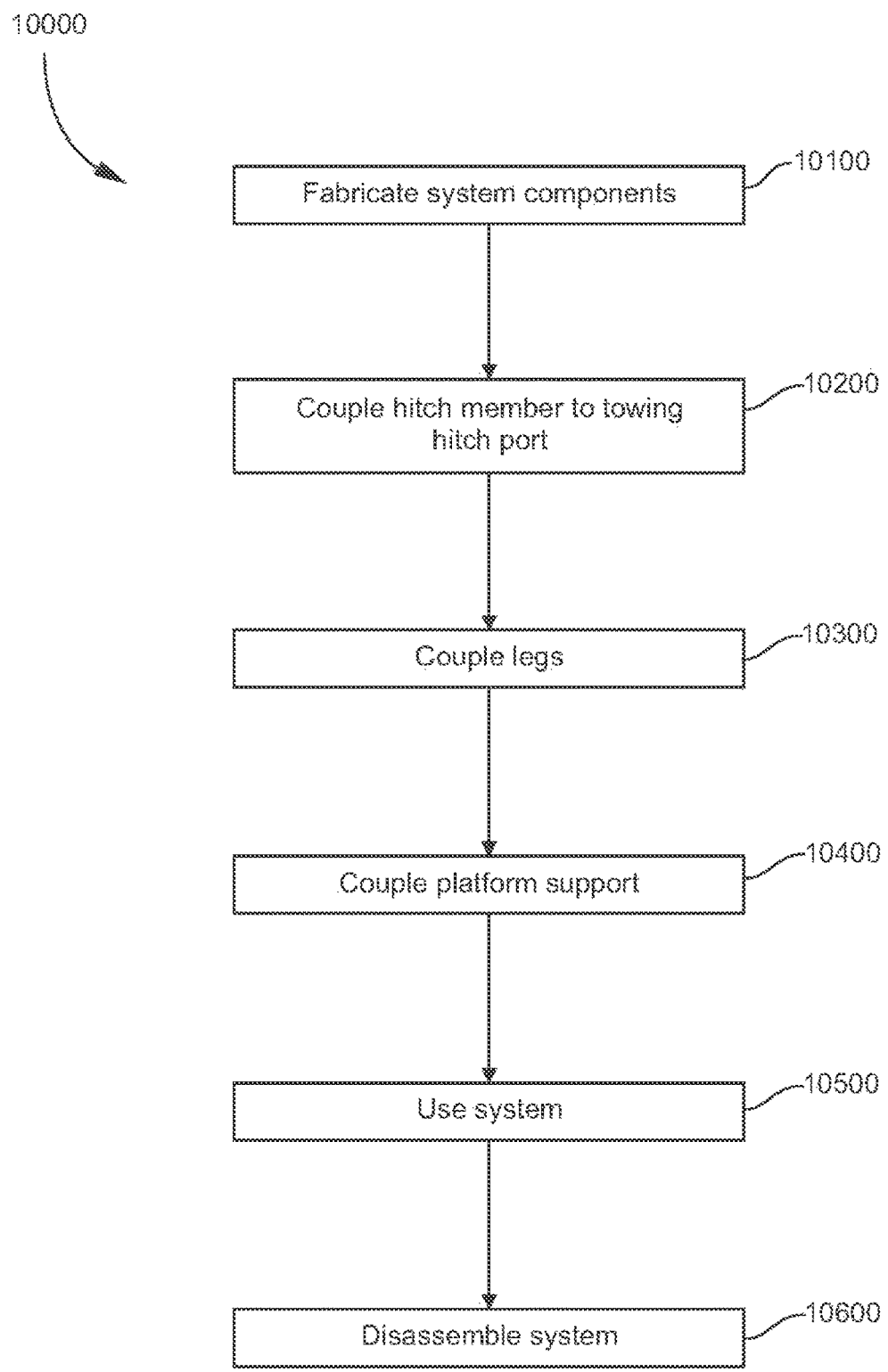
FIG. 10 is a flowchart of an exemplary embodiment of a method 10000.

FIG. 10 is a flowchart of an exemplary embodiment of a method 10000. At activity 10100, A system can be fabricated. The system can comprise:

a hitch member constructed to be releasably coupled to a towing hitch port of a vehicle;

a cross-member that can be coupled to the hitch member; when uncoupled from the vehicle, the hitch member can be constructed to rotate around a longitudinal axis of the cross-member;

a first adjustable leg that can be operatively coupled to the cross-member, which can define a set of adjustment apertures via which a pin can be used to establish a height of a first end of the cross-member relative to a surface upon which the vehicle rests;

a second adjustable leg that can be operatively coupled to the cross-member, which can define a set of adjustment apertures via which a pin can be used to establish a height of a second end of the cross-member relative to a surface upon which the vehicle rests;

a first adjustable platform support that can be operatively coupled to the cross-member, which can define a set of adjustment apertures via which a pin can be used to establish a height of the first adjustable platform relative to a surface upon which the vehicle rests; and a second adjustable platform support that can be operatively coupled to the cross-member, which can define a set of adjustment apertures via which a pin can be used to establish a height of the second adjustable platform relative to a surface upon which the vehicle rests.

At activity 10200, the hitch member can be coupled to a towing hitch port of a vehicle. At activity 10300, legs can be coupled to the system. At activity 10400, one or more platform supports can be coupled the system. At activity 10500, the system can be used while coupled to the vehicle. At activity 10600, the system can be disassembled and stored for future use.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
activity—an action, act, step, and/or process or portion thereof.
adapter—a device used to effect operative compatibility between different parts of one or more pieces of an apparatus or system.
adjust—to change something in at least one dimension.
adjustable—to be capable of being adjusted.
and/or—either in conjunction with or in alternative to.
aperture—an opening defined by an object.
apparatus—an appliance or device for a particular purpose.
associate—to join, connect together, and/or relate.
can—is capable of, in at least some embodiments.
canopy—a covering suspended above something.
carrying handle—a part of an object that can be grasped by a hand of a human to move or lift the object.
cause—to produce an effect.
collar—a tube constructed to substantially surround a cross-member and thereby couple a hitch member to the cross-member.
compress—to reduce in size via squeezing.
comprising—including but not limited to.
configure—to make suitable or fit for a specific use or situation.
connect—to join or fasten together.
constructed to—made to and/or designed to.
convert—to transform, adapt, and/or change.
coupleable—capable of being joined, connected, and/or linked together.
coupling—linking in some fashion.
create—to bring into being.
cross-member—a transverse structural piece that adds support to a system.
define—to establish the outline, form, or structure of.
determine—to obtain, calculate, decide, deduce, and/or ascertain.
device—a machine, manufacture, and/or collection thereof.
end—the last part or extremity, lengthwise, of anything that is longer than it is wide or broad.
engage—to interlock one component with another.
fabricate—to construct.
flag-pole—a rod constructed to support a banner, such as a cloth banner.
height—a distance from a base to an apex of something.
hitch member—a structural component constructed to engage with a trailer hitch coupling of a vehicle.
human—a person.
install—to connect or set in position and prepare for use.
leg—a support for a mechanical system.
length—a longest extent to something measured from end to end.
lift—to move upward relative to the surface of the earth.
longitudinal axis—a line along the lengthwise direction of the figure or body about which a three-dimensional body or figure is substantially symmetrical.
may—is allowed and/or permitted to, in at least some embodiments.
method—a process, procedure, and/or collection of related activities for accomplishing something.
operatively—in a manner that is efficacious to a particular purpose.
person—a human.
plurality—the state of being plural and/or more than one.
predetermined—established in advance.
provide—to furnish, supply, give, and/or make available.
relative—considered in relation to something else.
releasably—capable of being uncoupled in a manner that is substantially non-destructive.
rest—to be supported by, as a surface.
rotate—to cause to turn about an axis.
seat—something constructed to support a person in a sitting position.
set—a related plurality.
spring pin—a retractable projecting piece via which something is supported.
substantially—to a great extent or degree.
support—to bear the weight of, especially from below.
surface—an outer portion of an object.
system—a collection of mechanisms, devices, machines, articles of manufacture, processes, data, and/or instructions, the collection designed to perform one or more specific functions.
tailgate—a hinged door at a rear of a truck that opens to form a platform that is substantially level with a bed of the truck.

tailgating—a social event that typically involves eating and drinking held on and around the open tailgate of a vehicle.

tent—a portable shelter of skins, canvas, plastic, or the like.

towing hitch port—an aperture defined by a vehicle that is constructed to receive a device and/or system that can be coupled to a trailer or the like for towing.

umbrella—a cover constructed to offer protection from elements such as rain or sun.

vehicle—a conveyance fitted with wheels via which people and/or objects are transported.

via—by way of and/or utilizing.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
   a hitch member, said hitch member constructed to be releasably coupled to a towing hitch port of a vehicle;
   a cross-member, said cross-member operatively coupled to said hitch member, when uncoupled from said vehicle, said hitch member constructed to rotate around a longitudinal axis of said cross-member;
   a first adjustable leg, said first adjustable leg operatively coupled to said cross-member, said first adjustable leg defining a set of first leg adjustment apertures, a first adjustable leg pin constructed to engage with one of said set of first leg adjustment apertures to establish a height of a first end of said cross-member relative to a surface upon which said vehicle rests;
   a second adjustable leg, said first adjustable leg operatively coupled to said cross-member, said second adjustable leg defining a set of adjustment apertures, a second adjustable leg pin constructed to engage with one of said set of second leg adjustment apertures to establish a height of a second end of said cross-member relative to said surface upon which said vehicle rests;
   a first adjustable platform support, said first adjustable platform support operatively coupled to said cross-member, said first platform support comprising a set of first platform adjustment apertures, a first adjustable platform pin constructed to engage with one of said set of first platform adjustment apertures to establish a height of said first adjustable platform support relative to said surface upon which said vehicle rests; and
   a second adjustable platform support, said second adjustable platform support operatively coupled to said cross-member, said second platform support comprising a set of second platform adjustment apertures, a second adjustable platform pin constructed to engage with one of said set of second platform adjustment apertures to establish a height of said second adjustable platform support relative to said surface upon which said vehicle rests.

2. The system of claim 1, further comprising:
   a one person seat constructed to be operatively coupled to said first adjustable platform support.

3. The system of claim 1, further comprising:
   a one person seat constructed to be operatively coupled to said second adjustable platform support.

4. The system of claim 1, further comprising:
   a one person first seat constructed to be operatively coupled to said first adjustable platform support; and
   a one person second seat constructed to be operatively coupled to said second adjustable platform support.

5. The system of claim 1, further comprising:
   a multi-person seat constructed to be operatively coupled to said first adjustable platform support and said second adjustable platform support.

6. The system of claim 1, further comprising:
a work platform constructed to be operatively coupled to first adjustable platform support and said second adjustable platform support.

7. The system of claim 1, further comprising:
a tailgating platform constructed to be operatively coupled to first adjustable platform support and said second adjustable platform support.

8. The system of claim 1, further comprising:
an umbrella constructed to be operatively coupled to first adjustable platform support and said second adjustable platform support.

9. The system of claim 1, further comprising:
a canopy constructed to be operatively coupled to first adjustable platform support and said second adjustable platform support.

10. The system of claim 1, further comprising:
a tent constructed to be operatively coupled to first adjustable platform support and said second adjustable platform support.

11. The system of claim 1, further comprising:
a flag pole constructed to be operatively coupled to at least one of first adjustable platform support and said second adjustable platform support.

12. The system of claim 1, wherein:
said hitch member comprises a carrying handle, said carrying handle constructed to allow a human to lift said system when said system is not coupled to said vehicle.

13. The system of claim 1, wherein:
said hitch member is coupled to said cross-member via at least one collar.

14. The system of claim 1, wherein:
said hitch member has an adjustable length.

15. The system of claim 1, wherein:
at least one of said first adjustable leg pin and said second adjustable leg pin is a spring pin comprised by said first adjustable leg.

16. The system of claim 1, wherein:
at least one of said first platform pin and said second platform pin is a spring pin.

17. A method comprising:
fabricating a hitch member, said hitch member constructed to be releasably coupled to a towing hitch port of a vehicle;
   fabricating a cross-member, said cross-member operatively coupled to said hitch member, when uncoupled from said vehicle, said hitch member constructed to rotate around a longitudinal axis of said cross-member;
fabricating a first adjustable leg, said first adjustable leg operatively coupled to said cross-member, said first adjustable leg defining a set of adjustment apertures, said first adjustable leg comprising a spring pin, said spring pin of said first adjustable leg constructed to engage with one of said set of adjustment apertures of said first adjustable leg to establish a height of a first end of said cross-member relative to a surface upon which said vehicle rests;
fabricating a second adjustable leg, said first adjustable leg operatively coupled to said cross-member, said second adjustable leg defining a set of adjustment apertures, said second adjustable leg comprising a spring pin, said spring pin of said first adjustable leg constructed to engage with one of said set of adjustment apertures of said second adjustable leg to establish a height of a second end of said cross-member relative to said surface upon which said vehicle rests;
fabricating a first adjustable platform support, said first adjustable platform support operatively coupled to said cross-member, said first platform support comprising a set of adjustment apertures, said first adjustable platform support comprising a spring pin, said spring pin of said first adjustable platform support constructed to engage with one of said set of adjustment apertures of said first adjustable platform support to establish a height of said first adjustable platform support relative to said surface upon which said vehicle rests; and
fabricating a second adjustable platform support, said second adjustable platform support operatively coupled to said cross-member, said second platform support comprising a set of adjustment apertures, said second adjustable platform support comprising a spring pin, said spring pin of said second adjustable platform support constructed to engage with one of said set of adjustment apertures of said second adjustable platform support to establish a height of said second adjustable platform support relative to said surface upon which said vehicle rests.

* * * * *